United States Patent
Thürer et al.

(10) Patent No.: US 12,246,982 B2
(45) Date of Patent: Mar. 11, 2025

(54) PROCESS FOR THE PREPARATION OF SYNTHETIC QUARTZ GLASS

(71) Applicant: Heraeus Quarzglas GmbH & Co. KG, Hanau (DE)

(72) Inventors: Martin Thürer, Bitterfeld-Wolfen (DE); Walter Lehmann, Kleinostheim (DE); Martin Trommer, Bitterfelf-Wolfen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 17/553,143

(22) Filed: Dec. 16, 2021

(65) Prior Publication Data
US 2022/0185720 A1    Jun. 16, 2022

(30) Foreign Application Priority Data
Dec. 16, 2020   (EP) ..................... 20214478

(51) Int. Cl.
C03B 37/018    (2006.01)
(52) U.S. Cl.
CPC .. C03B 37/01853 (2013.01); C03B 37/01815 (2013.01); *C03B 2201/02* (2013.01)
(58) Field of Classification Search
None
See application file for complete search history.

(56) References Cited

U.S. PATENT DOCUMENTS

| | | | |
|---|---|---|---|
| 3,957,474 A | 5/1976 | Kobayashi et al. | |
| 6,751,987 B1 | 6/2004 | Ball | |
| 8,820,122 B2 | 9/2014 | Maida et al. | |
| 9,056,785 B2 | 6/2015 | Maida et al. | |
| 9,061,935 B2 | 6/2015 | Fabian | |
| 9,272,942 B2 | 3/2016 | Trommer et al. | |
| 9,481,597 B2 | 11/2016 | Badeke et al. | |
| 9,701,561 B2 | 7/2017 | Coapes et al. | |
| 10,011,518 B2 | 7/2018 | Badeke et al. | |
| 11,155,488 B2 | 10/2021 | Noda et al. | |
| 11,267,745 B2 | 3/2022 | Laudahn et al. | |
| 2004/0182114 A1 | 9/2004 | Ooishi et al. | |
| 2005/0223750 A1 | 10/2005 | Nutini et al. | |
| 2007/0251918 A1 | 11/2007 | Bera et al. | |

(Continued)

FOREIGN PATENT DOCUMENTS

| | | |
|---|---|---|
| CN | 102583974 | 7/2012 |
| CN | 102583977 | 7/2012 |

(Continued)

OTHER PUBLICATIONS

Toppr.com, Flame and Structure of a Flame, https://www.toppr.com/guides/chemistry/combustion-and-flame/flame-and-structure-of-a-flame/, available since Mar. 2019 (Year: 2019).*

*Primary Examiner* — Queenie S Dehghan
(74) *Attorney, Agent, or Firm* — Dicke, Billig & Czaja, PLLC

(57) ABSTRACT

Described is a process for the production of synthetic fused silica in which the deposition surface is located for a period of at least 50% of the build-up time of the soot body at a burner distance in which the horizontally integrated luminous intensity of the flame of the burner used in the targetless state is still at least ⅔ of the maximum horizontally integrated luminous intensity of the flame.

7 Claims, 1 Drawing Sheet

(56) References Cited

U.S. PATENT DOCUMENTS

| | | |
|---|---|---|
| 2014/0227512 A1 | 9/2014 | Smith et al. |
| 2015/0033799 A1 | 2/2015 | Ishihara et al. |
| 2019/0084866 A1 | 3/2019 | Oozeki |
| 2019/0300419 A1* | 10/2019 | Noda ................ C03B 37/0142 |
| 2020/0062635 A1* | 2/2020 | Agrawal ................ F23D 14/02 |
| 2022/0185715 A1 | 6/2022 | Thuerer et al. |
| 2022/0185716 A1 | 6/2022 | Thuerer et al. |

FOREIGN PATENT DOCUMENTS

| | | |
|---|---|---|
| CN | 102985378 | 3/2013 |
| CN | 103570225 | 2/2014 |
| CN | 107250068 | 10/2017 |
| DE | 101 02 611 | 8/2002 |
| DE | 102 25 106 | 2/2004 |
| DE | 102011119373 | 5/2012 |
| EP | 0163752 | 12/1985 |
| EP | 0622340 | 11/1994 |
| GB | 1061042 | 3/1967 |
| JP | S54-020024 | 2/1979 |
| JP | H06-305736 | 11/1994 |
| JP | 2005187319 | 7/2005 |
| JP | 2011-102232 | 5/2011 |
| JP | 2015-505809 | 2/2015 |
| WO | 90/10596 | 9/1990 |
| WO | 99/20574 | 4/1999 |

* cited by examiner

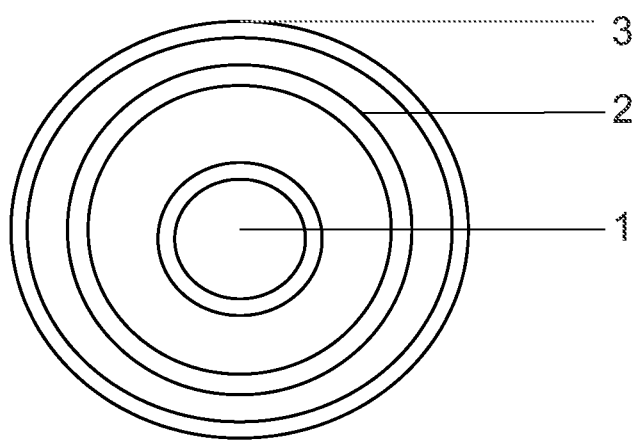

PROCESS FOR THE PREPARATION OF SYNTHETIC QUARTZ GLASS

CROSS-REFERENCE TO RELATED APPLICATIONS

This Utility Patent Application claims priority to European Application No. 20214478.8 filed on Dec. 16, 2020, which is incorporated herein by reference and is related to U.S. Ser. No. 17/553.270, filed Dec. 16, 2021 and U.S. Ser. No. 17/553,326 filed Dec. 16, 2021.

TECHNICAL FIELD

One aspect relates to a process for the production of synthetic quartz glass and a corresponding apparatus for carrying out the process according to the embodiments.

BACKGROUND

For the production of synthetic quartz glass, $SiO_2$ particles are generated from a silicon-containing starting substance in a CVD process by hydrolysis or oxidation and deposited on a moving carrier. A distinction can be made between external and internal deposition processes. In external deposition processes, the Sift particles are deposited on the outside of a rotating carrier. Examples of such external deposition processes are the so-called OVD process (Outside Vapour Phase Deposition), the VAD process (Vapour Phase Axial Deposition) or the PECVD process (Plasma Enhanced Chemical Vapour Deposition). The best-known example of an internal deposition process is the MCVD (Modified Chemical Vapor Deposition) process, in which $SiO_2$ particles are deposited on the inner wall of a tube heated from the outside.

At sufficiently high temperature in the area of the carrier surface, an unmediated vitrification of the $SiO_2$ particles occurs, which is also known as "direct vitrification." In contrast, in the so called "soot process" the temperature during deposition of the $SiO_2$ particles is so low that a porous $SiO_2$ soot layer is obtained, which is then sintered to transparent quartz glass in a separate process step. Both the direct vitrification and soot processes result in a dense, transparent, high-purity synthetic fused silica.

In the prior art processes for the production of synthetic fused silica, a method is generally used to ensure sufficient deposition efficiency of the $SiO_2$ particles, where deposition efficiency is understood to be the quotient of the weight of the soot body produced and the mathematically maximum total amount of $SiO_2$ that can be produced, assuming complete conversion of the silicon from the silicon-containing starting compound used. These commonly used conditions include, first of all, a ratio of oxygen to fuel (=silicon-containing starting substance plus the combustible auxiliary gases) that is as stoichiometric as possible to ensure essentially complete conversion to the desired target product. In addition, a stoichiometric ratio of oxygen to the silicon-containing starting material results in a high reaction temperature, which should also be preferable for the efficiency of the process. The stoichiometric ratio of fuel to air is also called the air number and should therefore be one. In the prior art, the silicon-containing starting substance is combusted regularly with a turbulent flame, which ensures good mixing of the individual gases (in particular oxygen and silicon-containing starting compound) and at the same time causes rapid conversion to the desired silicon dioxide. Carbon soot formation in the flame is avoided as far as possible in order to prevent carbon soot deposition on the resulting soot body. For this reason, the soot body is typically positioned in such a way that no yellowish carbon soot glow is visible at the flame impingement point, which is an indication of incomplete combustion and thus unconverted OMCTS.

A corresponding process for the production of synthetic quartz glass is described, for example, in WO 90/10596 A, in which an excess of oxygen and thus an air number greater than 1 is used in conjunction with the above explanations.

DE 101 02 611 A describes a process for the production of synthetic fused silica in which $SiO_2$ particles are formed in several deposition burners arranged in a row, each of which is assigned a burner flame, and deposited on a deposition surface of a support rotating about its longitudinal axis. The applied distance of the burner to the forming soot body is 160 to 240 mm, with the flame hitting the soot body. However, a more precise positioning of the burner in relation to the surface of the soot body produced cannot be taken from DE 101 02 611 A. Also, the technical influence of the distance of the burner from the surface of the soot body is not discussed in DE 101 02 611 A.

DE 102 25 106 A describes a common soot process for the production of synthetic quartz glass, in which primary particles are first formed in a pre-reaction zone from SiCl4, a fuel and an oxygen-containing medium, and are then converted into $SiO_2$-particles in a burner flame, which are then deposited on a carrier. In this context, DE 102 25 106 A focuses on improving the deposition efficiency, which is achieved by adjusting the volume ratio of a carrier gas used (hydrogen, $H_2$) to the $SiCl_4$ starting material.

US 2004/182114 A describes a common soot process for the production of synthetic fused silica, in which the deposition efficiency of the silicon-containing starting compound is investigated and in which it is found, among other things, that the deposition efficiency of the silicon-containing starting material can be improved if the distance of the burner from the deposition surface of the soot particles during the process is 150 to 500 mm. The deposition surface of the soot particles is located in the flame generated by the burner. However, a more precise positioning of the flame in relation to the surface of the generated soot body cannot be obtained from US 2004/182114 A.

In order to provide a carbonaceous soot body that has a lower OH value (good for fiber applications) after vitrification, DE 10 2011 121 153 A proposes to feed the polysiloxane compound into the flame superstoichiometrically compared to oxygen during the deposition of the SiO2 particles, i.e. to use a so-called rich flame during the deposition.

EP 3 549 921 A discloses a manufacturing method of a porous glass preform for optical fibre by depositing glass microparticles on a starting member, including supplying a vaporizer with an organic silicon compound raw material in a liquid state and a carrier gas; in the vaporizer, mixing and vaporizing the organic silicon compound raw material in a liquid state and the carrier gas to convert the organic silicon compound raw material and the carrier gas into a raw material mixed gas; supplying a burner with the raw material mixed gas and a combustible gas, combusting the raw material mixed gas and the combustible gas in the burner, and ejecting SiO microparticles generated by the combustion from the burner; and depositing the SiO microparticles ejected from the burner on the starting member by repeatedly moving the vaporizer and the burner together, in a synchronized manner, parallel to the starting member in a longitudinal direction thereof.

Overall, the prior art processes are still in need of improvement with respect to the deposition efficiency of the silicon-containing starting material, and there is therefore a need for a synthetic fused silica production process that can improve the deposition efficiency of the silicon-containing starting material. Improved deposition efficiency is accompanied by low manufacturing costs for the synthetic fused silica.

For these and other reasons there is a need for the present invention.

SUMMARY

One aspect is a process for the production of synthetic quartz glass, including:
(1) evaporating a feedstock containing at least one organosilicon starting compound to form a feedstock vapor;
(2) feeding the feedstock vapor from process step (1) to a reaction zone in which the feedstock vapor is combusted in a flame in the presence of oxygen and is converted to $SiO_2$ soot particles by oxidation and/or by hydrolysis;
(3) depositing the $SiO_2$ soot particles resulting from process step (2) on a deposition surface to form a soot body; and
(4) if necessary, drying and vitrifying the soot body resulting from process step (3) to form synthetic fused silica.

The process is then characterized in that in process step (3), the deposition surface for the $SiO_2$ soot particles is located at a distance from the burner for a period of at least 50% of the build-up time of the soot body, which lies between the position of the maximum of the luminous intensity of the targetless flame up to a position behind the maximum (viewed from the burner) at which the horizontally integrated luminous intensity of the flame is still at least ⅔ of the maximum.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 illustrates a burner geometry in accordance with one embodiment.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

In the context of one embodiment, the deposition efficiency is understood to be the quotient of the weight of $SiO_2$ deposited on the target tube to the total amount of $SiO_2$ produced mathematically (assuming complete conversion of all silicon from the precursor amount used).

According to one embodiment, this task is now solved by a process for the production of synthetic quartz glass, which is initially characterized by the following process steps:
(1) evaporating a feedstock containing at least one organosilicon starting compound to form a feedstock vapor;
(2) feeding the feedstock vapor from process step (1) to a reaction zone in which the feedstock vapor is combusted in a flame in the presence of oxygen and is converted to $SiO_2$ soot particles by oxidation and/or by hydrolysis;
(3) depositing the $SiO_2$ soot particles resulting from process step (2) on a deposition surface to form a soot body; and
(4) if necessary, drying and vitrifying the soot body resulting from process step (3) to form synthetic fused silica.

The process according to one embodiment is then characterized in that in process step (3), the deposition surface for the $SiO_2$ soot particles is located at a distance from the burner for a period of at least 50% of the build-up time of the soot body, which lies between the position of the maximum of the luminous intensity of the targetless flame up to a position behind the maximum (viewed from the burner) at which the horizontally integrated luminous intensity of the flame is still at least ⅔ of the maximum.

That said, the position of the deposition surface for the $SiO_2$ soot particles is located at a distance from the burner for a period of at least 50% of the build-up time of the soot body in which the luminous intensity of the targetless flame integrated horizontally over the entire flame, measured in candela/mm$^2$, is still at least ⅔ of the maximum horizontally integrated luminous intensity of the targetless flame at the maximum.

In the context of one embodiment, process step (2) may be carried out in the presence of combustible auxiliary gases, if necessary, and in the presence of non-oxidizing separation gases, if necessary.

Thus, in the context of one embodiment, it is envisaged that the distance between the burner (measured from the point at which contact is made with the surrounding environmental atmosphere) and the deposition surface is chosen to correspond to a distance (height) at which the undisturbed (targetless) flame has the maximum of its luminous intensity. The luminous intensity is the integral over the entire flame width at the respective height (distance to the burner).

Within the scope of one embodiment, it is further provided in particular that the burner spacing described above is not on both sides around the maximum of the luminous intensity of the flame, but lies between the position of the maximum of the luminous intensity of the targetless flame up to a position behind the maximum (viewed from the burner) at which the horizontally integrated luminous intensity of the flame is still at least ⅔ of the maximum.

The distance provided for in one embodiment is that between the burner (=the point where the burner gases meet the ambient atmosphere) and the place where the $SiO_2$ particles first deposit on the surface of a carrier and later on the surface of the soot body that is formed.

A targetless flame is understood to be a synthesis flame that is operated without a build-up tube, since otherwise the flame shape would depend on the thickness of the target tube (or soot body) and the distance of the burner from the target surface and the target temperature. The synthesis flame is generally essentially undisturbed.

In the context of one embodiment, it is particularly preferred if, in process step (3), the deposition surface for the $SiO_2$ soot particles is located for a period of at least 60%, in one embodiment at least 70%, in one embodiment at least 80%, in one embodiment at least 90%, in one embodiment at least 95%, in one embodiment 100%, of the build-up time of the soot body at a distance from the burner at which the luminous intensity of the targetless flame integrated horizontally over the entire flame width, measured in candela/mm, is still at least ⅔ of the maximum horizontally integrated luminous intensity of the targetless flame at the maximum.

One embodiment further relates to a generic process as defined above, in which the $SiO_2$ soot particles depositing on the soot body are located for a period of at least 50% of the build-up time of the soot body in a region of the flame (=distance from the burner) which is located in a region around the maximum of the luminous intensity of an essentially undisturbed targetless flame, in which the luminous intensity of the flame integrated horizontally over the entire flame width, measured in candela/mm, is still at least 70%, in one embodiment at least 72%, in one embodiment at least 74%, of the intensity at the maximum. According to one embodiment, it has proven advantageous that the positioning of the surface on which the $SiO_2$ particles are deposited is below the burnout length of the flame used, so that combustion can still take place on the surface.

Since the main contribution of the luminous intensity is blackbody radiation from unburned carbon, as spectral measurements have shown, the procedure according to one embodiment is actually counterintuitive. Since there is obviously not enough oxygen there to burn the carbon, it can be assumed that there is also not enough oxygen to completely convert the silicon in the starting compound to $SiO_2$. However, the main deposition mechanism according to the current state of the art is the effect of thermophoresis on already converted $SiO_2$ particles, where the hotter flame pushes the particles onto the colder deposition surface. However, since only reacted $SiO_2$ is in particle form, positioning the deposition surface at a point where the reaction is not yet complete should actually result in poorer deposition efficiencies.

According to one embodiment, it was thus found that the deposition efficiency of the $SiO_2$ particles can be significantly improved if the deposition surface is located in a certain area of the flame for a period of at least 50% of the build-up time of the soot body. Thus, the process according to one embodiment provides for a positioning of the surface of the soot body in the flame at least for a certain period of the build-up time of the soot body, so that a combustion of the silicon-containing starting compound can still take place at the surface of the soot body.

Here, in the context of one embodiment, the build-up time of the soot body is understood to be the time taken to feed the silicon-containing starting compound into the process according to one embodiment.

$$t_{Set-up\ time} = \Delta t_{Start-End\ Feeding\ silicon-containing\ starting\ compound}$$

The build-up time of the soot body depends on the desired size of the produced soot body.

The improved deposition efficiency according to one embodiment results, as already defined, from the quotient of the weight of the generated soot body and the calculated maximum amount of $SiO_2$ that can be generated, assuming complete conversion of the silicon from the silicon-containing starting compound used.

Since chemiluminescence occurs very locally and the luminous intensities in the UV and IR are more difficult to determine, a camera calibrated to the derived SI unit candela according to the procedure described below was used to determine the flame shape. Candela approximates the perception of the human eye and does not account for the UV and IR components, for which special cameras and windows would be required. Most of the intensity calibrated to candela is therefore derived from the blackbody radiation of the $SiO_2$ and carbon soot particles produced in the flame. The calibration to the SI unit candela is described in the experimental part below.

The specification of the distance of the burner from the surface of the soot body according to one embodiment means that the deposition surface is below the burnout length of the flame, above which there is no longer any unburned organosilicon starting compound, so that combustion can still take place at the surface of the soot body. This increases the separation efficiency in the process according to one embodiment in fundamental contrast to the view of the prior art, which recommends a position of the soot body above the burnout length, i.e. outside the flame.

To determine the luminous intensity of the flame at a certain height above the burner, the luminous intensity of the flame (in $cd/mm^2$) is integrated from the two-dimensional camera image per horizontal pixel row of the camera over the entire width of the flame (the unit is then cd/mm) and the value determined in this way is then determined for all pixel rows and calculated for the entire height of the flame. The luminous intensity of the targetless flame is then obtained as a function of the vertical distance from the burner.

The individual process steps of the method according to one embodiment are described in more detail below:

Process Step (1)—Evaporation of the Feed Material

In process step (1), a feedstock containing at least one organosilicon starting compound is vaporized to form a feedstock vapor. The organosilicon starting compound is in one embodiment a polyalkylsiloxane compound.

In principle, any polyalkylsiloxane compound suitable for the production of synthetic silica glass can be used according to one embodiment. In the context of one embodiment, the term polyalkylsiloxane encompasses both linear (including branched structures) and cyclic molecular structures.

Particularly suitable cyclic representatives are polyalkylsiloxanes with the general empirical formula $$Si_pO_p(R)_{2p},$$

where p is an integer greater than or equal to 3. The residue "R" is an alkyl group, in the simplest case a methyl group.

Polyalkylsiloxanes are characterized by a particularly high silicon content per weight fraction, which contributes to the economy of their use in the production of synthetic fused silica.

The polyalkylsiloxane compound is in one embodiment selected from the group consisting of hexamethylcyclotrisiloxane (D3), octamethylcyclotetrasiloxane (D4), decamethylcyclopentasiloxane (D5), dodecamethylcyclohexasiloxane (D6), tetradecamethylcycloheptasiloxane (D7), hexadecamethylcyclooctasiloxane (D8) as well as their linear homologues and any mixtures of the aforementioned compounds. The notation D3, D4, D6, D7 and D8 originates from a notation introduced by General Electric Inc. in which "D" represents the group $[(CH_3)_2Si]—O—$.

Mixtures of the above polyalkylsiloxane compounds may also be used within the scope of one embodiment.

Because of its large-scale availability in high purity, octamethylcyclotetrasiloxane (OMCTS) is currently preferred. In the context of one embodiment, it is therefore particularly preferred if the polyalkylsiloxane compound is octamethylcyclotetrasiloxane (D4).

In principle, it is possible for the feedstock to be purified before being introduced into process step (1). Such purification processes are known to the skilled person. In a preferred embodiment, however, the feedstock is not subjected to an upstream purification process beforehand.

Evaporation of the feedstock can take place with or without the presence of a carrier gas component. In one embodiment, the feedstock is evaporated in the presence of a carrier gas, since this allows the evaporation to take place at temperatures below the boiling point of the organosilicon starting compound. An inert gas, for example nitrogen or argon, is typically used as the carrier gas. If a carrier gas is used, the molar ratio of the organosilicon starting compound to the carrier gas is in one embodiment in the range from 0.01 to 2; in one embodiment in the range from 0.02 to 1.5; and in one embodiment in the range from 0.05 to 1.25. In particular, it is preferred that nitrogen with moisture content<40 ppm by volume is used as the carrier gas and OMCTS is used as the polyalkylsiloxane compound. It is further preferred that the molecular ratio of OMCTS to nitrogen is in the range of 0.015 to 1.5.

The evaporation step is known to the skilled person. Depending on the selected molecular ratio of the organosilicon starting compound and the carrier gas, the organosilicon starting compound is converted into a vapor phase, in one embodiment at temperatures between 120 and 200° C. The vaporization temperature in the evaporation chamber should always be at least a few degrees above the dew point of the organosilicon starting compound. The evaporation temperature in the evaporation chamber should always be at least a few degrees above the dew point of the organosilicon starting compound. The dew point is in turn dependent on the selected molecular ratio of organosilicon starting compound and carrier gas. In a preferred embodiment, this is achieved by preheating the organosilicon starting compound to temperatures between 40 and 120° C. prior to evaporation and then spraying it into an evaporation chamber that has a higher temperature than the preheating of the feedstock. In a preferred embodiment, the inert carrier gas can additionally be preheated to temperatures of up to 250° C. before being fed to the evaporation chamber. It is advantageous in one embodiment that the temperature in the evaporation chamber is always on average above the dew point temperature of the mixture of organosilicon starting compound and carrier gas. Suitable evaporation processes are described, for example, in international patent applications WO 2013/087751 A and WO 2014/187513 A and German Patent Application DE 10 2013 209 673.

In the context of one embodiment, the term "dew point" describes the temperature at which a state of equilibrium is reached between condensing and evaporating liquid.

In the context of one embodiment, "vaporization" is understood to be the process by which the feedstock is essentially converted from the liquid phase to a gaseous phase. This is in one embodiment done by using temperatures, as described above, which are above the dew point of the organosilicon starting compound as the main component of the feedstock. The skilled person is aware that, from a process engineering point of view, it cannot be ruled out that small liquid droplets of the feedstock may be entrained. Thus, in process step (1), a feedstock vapor is in one embodiment generated which in one embodiment contains not less than 97 mol %, in one embodiment not less than 98 mol %, in one embodiment not less than 99 mol %, in one embodiment not less than 99.9 mol % of gaseous components.

The vaporous organosilicon starting compound or a mixture of carrier gas and vaporous organosilicon starting compound is usually taken from the evaporation chamber and fed into a burner. Before being fed into the burner, the vaporous material or the mixture of vaporous material and carrier gas is in one embodiment mixed with oxygen. In the flame, the organosilicon starting compound is oxidized to $SiO_2$. Fine-particle, amorphous $SiO_2$ ($SiO_2$ soot) is formed, which is deposited in the form of a porous mass first on the surface of a carrier and later on the surface of the forming soot body.

Process Step (2)—Feeding the Feedstock Vapor to a Reaction Zone in Which the Feedstock Vapor is Burned in a Flame in the Presence of Oxygen and is Converted to $SiO_2$ Soot Particles by Oxidation and/or by Hydrolysis In process step (2), the gaseous feedstock vapor resulting from process step (1) is fed to a reaction zone in which the feedstock vapor is converted to $SiO_2$ particles by oxidation and/or hydrolysis.

This process step corresponds in particular to the known one. The possible design of this process is known to the skilled person.

For the combustion of the feedstock vapor, a concentric burner is usually used, which has gas outlet nozzles arranged in a circle around the center of the burner mouth.

In the context of one embodiment, a method is preferred in which a first organosilicon starting compound is fed to the separation burner in a central region, an oxygen stream is fed to the burner in an outer region, and a separation gas stream (containing hydrogen) is fed between the central region and the outer region.

The center nozzle is usually used to feed the feedstock vapor, which in the context of one embodiment is usually used premixed with a carrier gas. In addition, oxygen is in one embodiment added to the feedstock vapor, so that a feed stream results from the center nozzle of the concentric burner usually used, which contains the carrier gas and oxygen in addition to the feedstock vapor.

Thus, this preferred method according to one embodiment differs considerably from the method described in DE 10 2011 121 153 A, which recommends using a rich fuel mixture, i.e. an excess of $SiO_2$ starting compound and thus an undersupply of oxygen. The person skilled in the art who, based on the teachings of DE 10 2011 121 153 A, would like to improve the separation efficiency of the generic process would consider even further oxygen in the feed nozzle to be counterproductive.

The center nozzle of the burner is usually surrounded by a second nozzle concentrically arranged around the center nozzle, from which a separation gas is introduced into the burner. This separation gas separates the $SiO_2$ starting compound from the further oxygen stream entering the burner from another concentric nozzle arranged concentrically around the center nozzle and the separation gas nozzle.

According to one embodiment, the distance between the burner and the surface of the soot body is adjusted during the deposition process, if necessary, so that the above condition that the deposition surface is at a height (=distance from the burner) of the flame for a period of at least 50% of the build-up time of the soot body, in which the horizontally integrated luminous intensity of the flame operated targetlessly under the same conditions is still at least ⅔ of the maximum horizontally integrated luminous intensity of the flame, is achieved. The distance provided for in this case results from the following definition and may require adjustment due to the growth of the soot body.

For this purpose, it is basically possible to change the position of the burner and/or the soot body, whereby in a preferred embodiment the burner is moved while the position of the soot body is not changed.

In the case of a separation burner with nozzles flushing with the burner mouth, the distance between the separation burner and the deposition surface of the soot particles is defined as the shortest distance between the burner mouth and the surface of the soot body being formed. Otherwise, this distance is defined as the shortest distance between the point where the burner gases meet the environmental atmosphere and the surface of the soot body being formed. This is usually the central nozzle (center nozzle) of a in one embodiment used concentric burner shape.

The $SiO_2$ soot particles produced by using the deposition torch are usually deposited on a carrier tube rotating about its longitudinal axis, so that the soot body is built up layer by layer. For this purpose, the deposition torch can be moved back and forth along the longitudinal axis of the carrier tube between two turning points. Furthermore, the use of a burner block in which several deposition burners with each having a flame located side-by-side is preferred. In the case of using a burner block, the distance between at least one burner, further in one embodiment each individual burner, and the surface of the soot body is in one embodiment adjusted according to the consideration of one embodiment.

Within the scope of one embodiment, it was further found that it is favorable for the yield efficiency if the air ratio, i.e. the ratio of oxygen from the burner (incl. feed oxygen) to all combustible materials actively (i.e. under pressure) fed to the burner, is less than or equal to 1 (rich flame). According to one embodiment, it is therefore further preferred that oxygen is used in process step (2) sub-stoichiometrically in relation to the feedstock vapor to be hydrolyzed and/or polymerized.

Further preferred are air numbers less than or equal to 0.95, even further preferred less than or equal to 0.90, even further preferred less than or equal to 0.85, even further preferred less than or equal to 0.80, even further preferred less than or equal to 0.78, even further preferred less than or equal to 0.76.

By adjusting the air number to the previously mentioned preferred ranges, together with the adjustment of the distance between the burner and the surface of the soot body according to one embodiment, it is possible to further improve the deposition efficiency, since the characteristics of the flame used according to one embodiment are influenced by setting an air number to a value less than or equal to 1, resulting in improved deposition efficiency.

The air number $\lambda$ is defined as the ratio of the actual amount of oxygen available to the minimum amount of oxygen theoretically required for stoichiometrically complete combustion.

The use of a richer burning mixture (accompanied by an air number of less than or equal to 1) leads to a later, local ignition of only the edge areas of the flame. At first, only the outer edge areas of the feed nozzle stream ignite, into which enough $O_2$ from the outer oxidizing gas (oxygen) nozzle(s) has already diffused. The core area of the flame is more unwilling to ignite due to the too rich mixture. As a result, only a smaller volume of gas ignites at the same time and the oxygen must first diffuse in. The expansion of the hot combustion gases from areas that have ignited makes the flame more turbulent. The effect is self-reinforcing, as the increased turbulence promotes mixing with oxygen. The gas volume that has ignitable mixing stretches far upward in the process of one embodiment and has less lateral expansion. This results in a much more laminar flame. The associated effect is that the narrower, more laminar flame attaches itself better to the soot body and forms a more stable stagnation point. This leads to shorter diffusion paths for the $SiO_2$ particles to the deposition surface of the soot body and increases the residence time at the stagnation point, resulting in higher deposition efficiency overall.

The reduced ignition capability in the richer gas arrangement causes a reduction in the size of the gas regions that ignite simultaneously (smaller "flamelets"). The large increase in volume in such zones due to thermal expansion and mole gain (for example, 1 mole of OMCTS gas produces x times the number of moles of combustion gases) due to decomposition creates pressure waves that make the flame much more turbulent. Therefore, less simultaneous ignition volume results in a more laminar flame with higher burnout length with the benefits described earlier. It must be taken into account that in the burner and flame center in the process according to one embodiment, only feed stream and hydrogen are present, which together are too rich to ignite quickly, and that the oxygen from the outer nozzle reaches the center later, distributed over a longer distance, because of lower turbulence.

Since in the context of one embodiment the feedstock is in one embodiment discharged into the combustion zone together with a carrier gas and oxygen from the central nozzle of the preferably concentric burner, it must be taken into account that the amount of oxygen used to calculate the air number results from the admixture of oxygen into the stream of feedstock and the additional oxygen used in the outer nozzle (fuel gas) of the concentric burner.

Within the scope of the process according to one embodiment, the air number can be reduced significantly below the value defined by DE 10 2011 121 153 A and, at the same time, the separation efficiency can be significantly increased.

Process Step (3)—Deposition of the $SiO_2$ Particles

In process step (3), the $SiO_2$ particles resulting from process step (2) are deposited on a deposition surface. The design of this process step is within the skill and knowledge of the specialist.

For this purpose, the $SiO_2$ particles formed in process step (2) are deposited layer by layer on a rotating carrier to form a porous soot body.

During the deposition of the Soot particles, the distance between the torch and the support material is changed, if necessary, in order to fulfill the condition described earlier.

Process Step (4)—Drying and Vitrification, if Necessary

In process step (4), the $SiO_2$ particles resulting from process step (3) are dried and vitrified, if necessary, to form synthetic quartz glass. This process step is particularly necessary if the previously performed process steps were carried out according to a soot process. The design of this process step is within the skill and knowledge of the person skilled in the art.

The process according to one embodiment is suitable for the production of quartz glass by the "soot process", in which the temperature during deposition of the $SiO_2$ particles in process step (3) is so low that a porous $SiO_2$ soot is obtained, which is dried and vitrified in a separate process step (4) to form synthetic quartz glass.

The process according to one embodiment is in particular an Outside Vapor Deposition Method (OVD) process, Vapor Axial Deposition (VAD) process or a Soot-Boule process. Corresponding OVD and VAD processes are sufficiently known to those skilled in the art, and a Soot-Boule process is known, for example, from U.S. Pat. No. 8,230,701.

The process according to one embodiment can reduce the manufacturing costs for quartz glass.

A further embodiment is an apparatus for producing synthetic fused silica, wherein apparatus comprises:
(a) at least one evaporator zone for evaporating at least one feedstock containing at least one organosilicon starting compound to form a feedstock vapor, the evaporation zone including an evaporation unit;
(b) at least one reaction zone into which the feedstock vapor from process step (a) is fed and in which the feedstock is converted to $SiO_2$ particles by pyrolysis or by hydrolysis, the reaction zone including a burner; and
(c) at least one deposition zone including a deposition zone for the $SiO_2$ particles resulting from the reaction zone (b) to form synthetic fused silica, wherein the deposition zone comprises a soot body.

In the device according to one embodiment in the reaction zone (b), the distance of the burner from the surface of the soot body can be varied and can be adjusted at least in such a way that the surface of the soot body is located in a range of the flame (=burner distance) which extends between the position (height) of the maximum of the luminous intensity of a targetless reference flame operated under the same gas flows and a point behind the maximum (viewed from the burner) at which the horizontally integrated luminous intensity of the flame (over the entire flame width at the respective height) is still at least ⅔ of the maximum horizontally integrated luminous intensity of the flame.

One embodiment further relates to a generic device as defined above, in which the $SiO_2$-soot particles depositing on the soot body are located for a period of at least 50% of the build-up time of the soot body in a region of the flame (=distance from the burner) which is located in a region around the maximum of the luminous intensity of the essentially undisturbed targetless flame, in which the luminous intensity of the flame integrated horizontally over the entire flame width, measured in candela/mm, is still at least 70%, in one embodiment at least 72%, in one embodiment at least 74%, of the intensity at the maximum.

In the context of one embodiment, it is particularly preferred if the device according to one embodiment is designed in such a way that (in process step (3)) the deposition surface for the $SiO_2$ soot particles is located for a period of at least 60%, in one embodiment at least 70%, in one embodiment at least 80%, in one embodiment at least 90%, in one embodiment at least 95%, in one embodiment 100%, of the build-up time of the soot body at a distance from the burner in which the luminous intensity of the targetless flame integrated horizontally over the entire flame, measured in Candela/mm, is still at least ⅔ of the maximum horizontally integrated luminous intensity of the targetless flame at the maximum.

According to one embodiment, it has proven advantageous that the positioning of the surface on which the $SiO_2$ particles are deposited is below the burnout length of the flame used, so that combustion can still take place on the surface.

In accordance with the above explanations on the process according to one embodiment, the gas flows in the burner of the apparatus according to one embodiment, i.e. the ratio of oxygen from the burner (incl. feed oxygen) to all combustible materials actively (i.e. under pressure) supplied to the burner, are in one embodiment adjusted in such a way that an air number for all gases actively (i.e. under pressure) supplied to the burner is realized smaller than or equal to 1.

In accordance with the above discussion of the process according to one embodiment, the gas flows in the burner of the apparatus according to one embodiment, i.e., the ratio of oxygen actively supplied under pressure from the burner (including central nozzle feed oxygen) to all combustibles actively (i.e., under pressure) supplied to the burner, are in one embodiment adjusted to realize an air number less than or equal to 0.90.

In accordance with the above explanations on the process according to one embodiment, the gas flows in the burner of the apparatus according to one embodiment, i.e. the ratio of oxygen from the burner (including central nozzle feed oxygen) to all combustible materials actively (i.e. under pressure) fed to the burner, are in one embodiment adjusted so that an air number less than or equal to 0.85 is realized.

In accordance with the above discussion of the process according to one embodiment, the gas flows in the burner of the apparatus according to one embodiment, i.e., the ratio of oxygen from the burner (including central nozzle feed oxygen) to all combustible materials actively (i.e., under pressure) fed to the burner, are in one embodiment adjusted to realize an air number less than or equal to 0.80.

In accordance with the above discussion of the process according to one embodiment, the gas flows in the burner of the apparatus according to one embodiment, i.e., the ratio of oxygen from the burner (including central nozzle feed oxygen) to all combustible materials actively (i.e., under pressure) fed to the burner, are in one embodiment adjusted to realize an air number less than or equal to 0.78.

In accordance with the above discussion of the process according to one embodiment, the gas flows in the burner of the apparatus according to one embodiment, i.e., the ratio of oxygen from the burner (including central nozzle feed oxygen) to all combustible materials actively (i.e., under pressure) fed to the burner, are in one embodiment adjusted to realize an air number less than or equal to 0.76.

The air number $\lambda$ is defined as the ratio of the actual amount of oxygen available to the minimum amount of oxygen theoretically required for stoichiometrically complete combustion.

The burner of the apparatus according to one embodiment has a concentric cross-section, wherein inside the concentric cross-section the feedstock vapor is introduced into the burner flame together with oxygen as a feed mix and the feed mix is separated from the oxygen-containing fuel gas by a separation gas.

Further relevant features can be found in the above process description.

Finally, one embodiment relates to the use of this apparatus for the production of synthetic fused silica.

EXAMPLES

Liquid feedstock OMCTS together with nitrogen as carrier gas, which has been pre-heated to 180° C., is vaporized at 170° C. in a vaporizer according to the embodiment of international patent application PCT/EP2012/075346. The nitrogen-OMCTS vapor mixture is introduced into a concentric burner together with oxygen ($O_2$ mix), the burner being operated under the following conditions:

|  | Try 1 | Try 2 | Try 3 |
|---|---|---|---|
| OMCTS (kg/h) | Constant | Constant | Constant |
| $O_2$-Mix (sl/min) | Constant | Constant | Constant |
| $O_2$-Brenn (sl/min) | Constant | Constant | Constant |
| $H_2$ (sl/min) | Constant | Constant | Constant |
| $N_2$ (sl/min) | Constant | Constant | Constant |
| Air number λ | 0.78 | 0.78 | 0.78 |
| Distance burner-body (mm) | 110.00 | 190.00 | 140.00 |
| Intensity (Cd/mm) | 1113911.72 | 602721.2691 | 1139597.015 |
| Distance according to the embodiment | No | No | Yes |
| Efficiency | + | − | + |
| Comment | Torch slowly overgrows with $SiO_2$ deposits and must be changed frequently (not suitable for production). |  | Burner does not overgrow, high efficiency guaranteed |

Maximum intensity: 1162491.649
Meaning:
−: poor separation efficiency
+: improved separation efficiency In experiments 1 and 2, the surface of the soot body is at a burner distance outside the luminous intensity of the flame according to one embodiment, while the distance between the surface of the soot body and the burner in experiment 3 according to one embodiment is such that the soot body is in the flame in the range according to one embodiment for at least a period of 50% of the build-up time of the soot body.

In the experiments described above, a concentric burner is used, with the so-called feed mixture being introduced into the burner area through the inner nozzle. The feed mixture consists of the polymerizable polyalkylsiloxane compound OMCTS, an $N_2$ carrier gas and an $O_2$ mix. The inner nozzle of the burner is surrounded by a central nozzle concentric around the inner nozzle, from which $H_2$ gas enters the burner area as a separation gas. In the outer concentric nozzle, the oxygen is introduced as a burning agent ($O_2$ burning).

The burner geometry used in this embodiment is shown in FIG. 1, which represent
1: the inner nozzle;
2: the middle nozzle; and
3: the outer nozzle The calibration of the light intensity of $SiO_2$ synthesis flames was performed in the above experiment as follows:

Calibration of the flame luminous intensity was performed by comparison with a calibrated light source (LOT-Oriel K-150WH with Gossen-Metrawatt constant SLP120-80/snTD4541060001; first calibration by opto.cal SCS 053, certificate number 09333 on Apr. 11, 2009; second calibration by opto.cal SCS 053, certificate number 16428 on Sep. 12, 2016).

In order to calibrate the sensitivity of the camera, the calibration light source was mounted at the typical distance at which the measurements are performed. For the current setup, the working distance is 450 mm. Due to the perfect Lambertian emissive characteristics, the luminous intensity behaves in a 1/r2 manner, so in the experiments the luminous flux can be calculated with the distance used for calibration by opto.cal for the working distance.

In the calibration protocol, the illuminance is the target calibration parameter. For this calibration, the luminance is more suitable due to the reference to the emission area. Therefore, the unit of illuminance [Ev]=1m/m2=1×was converted to the unit of luminance [Lv]=cd/$m^2$ or Cd/$mm^2$.

For Lambert's radiators, this conversion requires the additional knowledge of the distances during calibration and measurement. This specific light source has an illuminance of Ev=293.5 1×at a distance of 250 mm, while the illuminance is Iv=90.59 Cd at a distance of 450 mm; the working distance for the experiments. The application of light intensity is a detector-based unit, i.e., it is based on the detector area and integrates the total light emission. To enable an emitter-based measurement, the effective emitter area is included so that the resulting unit is the luminance.

The application of photometric units (lux/lumen/candela) uses the CIE luminance function to mimic the spectral sensitivity of the human eye. The calibration light source and flame emissions have different spectral characteristics. Therefore, the CIE luminance function is used to weight the wavelength-dependent emissions and to obtain photometric units.

The camera used is a Basler acA1300-200 μm with Basler C125-0818-5M-P f8 mm. The camera was set once to provide technically useful measurement signals, and then the focal length, aperture, and position of the camera to the flame were fixed and kept constant throughout the measurements.

The spectrally resolved emission spectrum of the calibration light source is reported in the calibration protocol with a wavelength resolution of 2 nm from 280 nm to 800 nm, which is large enough to cover the entire CIE luminosity function. The emissions from the flame were spectrally resolved for different conditions.

With these prerequisites, it is possible to measure the light intensity of the flame against a calibrated light source traceable to the Swiss Metrology Institute.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A process for producing synthetic quartz glass, comprising:
   (1) evaporating a feedstock containing at least one organosilicon starting compound to form a feedstock vapor;
   (2) feeding the feedstock vapor from (1) to a reaction zone in which the feedstock vapor is burned in a flame from a burner in the presence of oxygen and, if necessary, in the presence of combustible auxiliary gases and is converted to $SiO_2$ soot particles by oxidation or by hydrolysis;
   (3) depositing the $SiO_2$ soot particles resulting from (2) on a deposition surface to form a soot body;

if necessary, drying and vitrification of the SiO$_2$ particles resulting from (3) to form synthetic fused silica;

characterized in that in (3), the deposition surface for the SiO$_2$ soot particles is located at a distance from the burner for a period of at least 50% of the build-up time of the soot body, which lies between a position just behind the maximum (viewed from the burner) of the horizontally integrated luminous intensity [in candela/(mm of flame height] of the same flame mentioned above under un disturbed conditions (i.e. with removed deposition surface) up to a position behind the maximum (viewed from the burner) at which the horizontally integrated luminous intensity of the flame is still at least 2/3 of the maximum, wherein the luminous intensity of the flame is measured in candela/(mm$^2$ of flame area).

2. The process according to claim 1, characterized in that in (2) the oxygen and the combustible auxiliary gases are actively supplied to the burner, wherein all gases actively supplied to the burner in (2) together have an air number less than or equal to 1.

3. The process according to claim 1, characterized in that in (2) the oxygen and the combustible auxiliary gases are actively supplied to the burner, wherein all gases actively supplied to the burner in (2) together have an air number of less than or equal to 0.85 or less.

4. The process according to claim 1, characterized in that in (2) the oxygen and the combustible auxiliary gases are actively supplied to the burner, wherein all gases actively supplied to the burner in (2) together have an air number less than or equal to 0.76 or less.

5. The process according to claim 1, characterized in that (2) is carried out by the burner having a concentric cross-section, wherein inside the concentric cross-section the oxygen is introduced as a feed-mix together with the feedstock vapor into the burner flame as well as an oxygen-containing fuel gas, wherein the feed-mix is separated from the oxygen-containing fuel gas by a separation gas.

6. The process according to claim 1, characterized in that the organosilicon starting compound is selected from the group consisting of hexamethylcyclotrisiloxane (D3), octamethylcyclotetrasiloxane (D4), decamethylcyclopentasiloxane (D5), decamethylcyclohexasiloxane (D6), tetradecamethylcycloheptasiloxane (D7), hexadecamethylcyclooctasiloxane (D8), their linear homologues and any mixtures of the above compounds.

7. The process according to claim 6, characterized in that the organosilicon starting compound is octamethylcyclotetrasiloxane (D4).

* * * * *